(12) United States Patent
Patterson

(10) Patent No.: US 7,364,181 B2
(45) Date of Patent: Apr. 29, 2008

(54) SELF LOCKING COUPLING DEVICE

(75) Inventor: Roger L. Patterson, Duncan (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 0 days.

(21) Appl. No.: 11/246,565

(22) Filed: Oct. 11, 2005

(65) Prior Publication Data

US 2007/0080517 A1    Apr. 12, 2007

(51) Int. Cl.
*B60D 1/00* (2006.01)
*A01B 59/00* (2006.01)

(52) U.S. Cl. .............. 280/504; 292/163; 292/302; 24/600.4; 172/272; 172/678

(58) Field of Classification Search .......... 292/163, 292/164, 167, 173, 175, 302; 172/677–680, 172/439, 272–275; 280/400.1, 461.1, 504; 24/600.4, 600.5, 600.6, 600.7, 600.8, 600.9, 24/601.1
See application file for complete search history.

(56) References Cited

U.S. PATENT DOCUMENTS

| | | | | |
|---|---|---|---|---|
| 1,198,139 | A * | 9/1916 | Lyon | 294/82.35 |
| 1,522,979 | A * | 1/1925 | Ratigan | 294/82.23 |
| 1,651,607 | A * | 12/1927 | Kurtz | 294/75 |
| 1,740,782 | A * | 12/1929 | Ratigan | 294/82.23 |
| 2,295,021 | A * | 9/1942 | Weiss | 280/506 |
| 2,760,707 | A * | 8/1956 | Anderson | 182/115 |
| 2,844,397 | A * | 7/1958 | Du Shane | 403/44 |
| 3,061,334 | A * | 10/1962 | Everett et al. | 280/513 |
| 3,186,055 | A * | 6/1965 | Modrey | 294/82.23 |
| 3,361,447 | A * | 1/1968 | Engelmann | 280/504 |
| 3,384,937 | A * | 5/1968 | Ludwig et al. | 280/482 |
| 3,406,995 | A * | 10/1968 | McCarthy | 292/169.15 |
| 3,531,140 | A * | 9/1970 | Fadden et al. | 280/477 |
| 4,050,715 | A * | 9/1977 | von Allworden | 280/508 |
| 4,135,747 | A * | 1/1979 | Melilli | 292/175 |
| 4,241,935 | A * | 12/1980 | Vollmer et al. | 172/272 |
| 4,778,205 | A * | 10/1988 | Sayre | 292/171 |
| 6,070,308 | A * | 6/2000 | Rohlf | 24/600.8 |
| 6,422,322 | B1 * | 7/2002 | Hoffart | 172/439 |
| 6,478,094 | B2 * | 11/2002 | Alexander et al. | 172/439 |
| 6,505,849 | B1 * | 1/2003 | Ebey | 280/513 |
| 6,662,409 | B2 * | 12/2003 | Benecke | 24/369 |

FOREIGN PATENT DOCUMENTS

EP    1 403 101 A1    3/2004

* cited by examiner

*Primary Examiner*—Carlos Lugo
(74) *Attorney, Agent, or Firm*—Adrian D. Battison; Michael R. Williams; Ryan W. Dupuis

(57) ABSTRACT

A coupling device that requires no manual actuation to achieve coupling features a locking bolt movable along a hole extending into a mouth of a hook body to secure a coupling pin therein. A control lever pivotally connected to the locking bolt opposite the mouth end is biased toward a locked position in which motion of the locking bolt is blocked. To engage the coupling pin and the hook mouth, the coupling pin and an operable pin extending through the hollow locking bolt are brought into contact. This causes an end of the operable pin opposite the mouth to push against the control lever to unlock it from the latching position. The coupling pin pushes the locking bolt out of the mouth so that it can pass by further into it, at which point the lever and bolt return to the locked positions to secure the coupling pin inside.

18 Claims, 6 Drawing Sheets

SELF LOCKING COUPLING DEVICE

This invention relates to a coupling device that locks to a coupling member or member to be hooked to prevent inadvertent separation of the two and more particularly to a self locking coupling device that can receive and lock the coupling member in the mouth of a hook without manual actuation of its locking components.

BACKGROUND OF THE INVENTION

Removable coupling devices such as hooks are commonly used to temporarily connect two separate objects. Often, it is necessary or desirable to provide a removable connection that can be locked in order to ensure that the two objects are not inadvertently separated before it is desirable to do so. For example, three-point hitch systems for tractors and other agricultural vehicles often feature an upper link having a hook that operates in a locking fashion to prevent detachment of an implement from the vehicle during its use. While described in this context, the present invention is not intended to be limited to this particular application.

Upper hooks for three-point tractor hitch systems that lock a coupling sphere or pin of an implement within the mouth of the hook are currently available to prevent accidental separation of the tractor and implement during use. U.S. Pat. No. 4,241,935 and European Patent Application Publication No. 1,403,101 both describe such upper hooks having a latch for controlling the motion of a locking bolt passing through an opening in the hook body for selectively blocking a portion of the hook mouth housing a coupling sphere within. The inventions in the above patent documents each provide a coupling eye on the control lever for attachment of a cable by means of which the control lever can be actuated between latching and unlatching positions from a distance. While this feature allows connection of the upper hook to the coupling sphere without the user having to dismount the tractor seat, actuation of the locking components by the user is still required.

U.S. Pat. No. 6,478,094 describes another three-point tractor hitch which allows the attachment of an implement without requiring the operator to leave the tractor seat. The upper link of the hitch includes a stationary jaw having a movable jaw pivotally attached to it in such a way that lowering the movable jaw onto a coupling pin of the implement will cause the movable jaw to pivot upward into the stationary jaw. In this position, the coupling pin is held within the two jaws and a latching mechanism prevents further relative motion of the jaws, thereby locking the pin in place. The length of the upper link is adjustable from the tractor seat as the jaws are connected to the tractor by a linear hydraulic actuator. This invention does not require a control lever to be held in an unlatched position during connection of the hitch and implement. However, the invention requires accurate placement of the upper link such that the movable jaw is positioned directly over the coupling pin, which despite the addition of the hydraulic actuator that can be operated from the tractor seat, can still be difficult and time consuming for a single user.

SUMMARY OF THE INVENTION

It is an object of the present invention to provide a coupling device that can connect to a coupling member in a locking fashion without requiring manual actuation of its locking components and overly accurate positioning during the connection process. Such a device would facilitate quick and easy coupling by a single operator.

According to a first aspect of the invention there is provided a coupling device comprising:

a hook body shaped to define an outer surface with a mouth extending inward from the outer surface of said hook body, said mouth having an end portion spaced from said outer surface, such that a member to be hooked can enter the mouth from the outer surface and move to the end portion to effect coupling between the hook body and the member;

a securing member supported on the hook body and extending toward the mouth, said securing member being movable between an extended position in which said securing member substantially obstructs passage of the hooked member to and from the end portion and a retracted position in which said securing member does not substantially obstruct said passage;

the securing member being biased toward the extended position;

a releasable locking arrangement for locking the securing member in the extended position to prevent unwanted movement toward the retracted position;

a releasing member supported on the hook body and presenting an end portion at the outer surface operable by engagement with an element at the outer surface of the hook body to unlock the securing member and allow movement thereof toward the retracted position, actuation of said releasing member thereby opening the passage of the member to be hooked to the end portion of the mouth.

The present invention provides a coupling device that can engage a coupling portion of an object in a locking fashion without requiring manual actuation of components or an excessive amount of accuracy in positioning the device for coupling. Contact between a coupling member of the object being connected to the device and the releasing member unlocks the securing member so that it can be pushed by the coupling member to the retracted position in which the mouth of the hook is open. The coupling member moves into the mouth past the retracted securing member to an inner end of the mouth. The securing member is biased toward the extended position so that once cleared by the coupling member, it will return to its locked state in the extending position to secure the coupling member in the mouth.

Preferably the hook body has a rectilinear hole extending therethrough to the mouth of said hook body and the securing member is a locking bolt coaxially received in said hole for movement therealong.

Preferably there is provided a control lever pivotally coupled to the locking bolt at a pivot point adjacent an end of said locking bolt opposite the mouth, said control lever being movable between a latching position in which the locking bolt is in the extended position and an unlatching position in which said locking bolt is in the retracted position.

Preferably the control lever has an abutting surface and the hook body has a bearing surface, the surfaces being spaced from the pivot point to a first side thereof and being arranged to engage upon movement of said control lever from the latching position induced by movement of the locking bolt from the extended position to block further motion of said control lever and said locking bolt, thereby locking said locking bolt in the extended position.

Preferably the release member comprises a pin having a first end adjacent the outer surface of the hook body from which the mouth extends and a second end for engagement with the control lever on the first side of the pivot point, said pin being operable with the locking bolt in the extended position by pushing on said first end such that said second end pivots the control lever out of the latching position, thereby disengaging the abutting and bearing surfaces to unlock said locking bolt from the extended position. Preferably the locking bolt is hollow and the pin is received in said locking bolt for movement therealong.

Preferably the pin comprises an extension portion extending outward from the locking bolt adjacent the end of said locking bolt opposite the mouth, the second end of said pin being disposed on said extension portion.

Preferably there is provided a spring for biasing the securing member toward the extended position such that said securing member tends to return to said extended position after actuation of the releasing member.

Preferably there is provided a torsion spring pivotally connected at opposite ends thereof to the control lever and the hook body to bias said control lever toward the latching position such that said securing member tends to return to said extended position after actuation of the releasing member.

Preferably the hook body further comprises a groove for receiving an end of the control lever as said control lever reaches the unlatching position, said end being on a second side of the pivot point opposite the first side thereof.

Preferably the torsion spring is connected to the hook body on a first side of the pivot point, said torsion spring is connected to the control lever on said first side with said lever out of the unlatching position and said pivot spring is connected to said control lever on a second side opposite said first side with said control lever in the unlatching position such that said control lever is held in the unlatching position with the end of said control lever received in the groove and said control lever is biased toward the latching position when said end is removed from said groove, the securing member thereby tending to return to said extended position after actuation of the releasing member unless said control lever is in the unlatching position.

Preferably the mouth extends inward from the outer surface of the hook body at an oblique angle to a longitudinal axis of the hook body.

Preferably the control lever comprises a U-shaped channel member having side walls, the locking bolt being disposed between said side walls.

Preferably the control lever comprises a recess defining the abutment surface thereof and the hook body comprises a protrusion defining the bearing surface thereof.

The hook body may comprise a shaped ledge extending from the first side of the pivot point to the second side thereof, said ledge defining the bearing surface and the groove at opposite ends thereof.

There may be provided a support member, the hook body being supported on an end of said support member. In this case, preferably the outer surface of the hook body slopes from the support member toward the mouth of the hook body and the support member comprises a hydraulic cylinder which is adjustable in length.

There may be provided a locking pin and the control lever and the hook body may each have a transverse hole therethrough, said holes being aligned with said control lever in the latching position such that said locking pin can be passed therethrough to secure the locking bolt and said control lever in the extended and latching positions respectively regardless of actuation of the release member.

BRIEF DESCRIPTION OF THE DRAWINGS

In the accompanying drawings, which illustrate an exemplary embodiment of the present invention.

DETAILED DESCRIPTION

Figure 1:
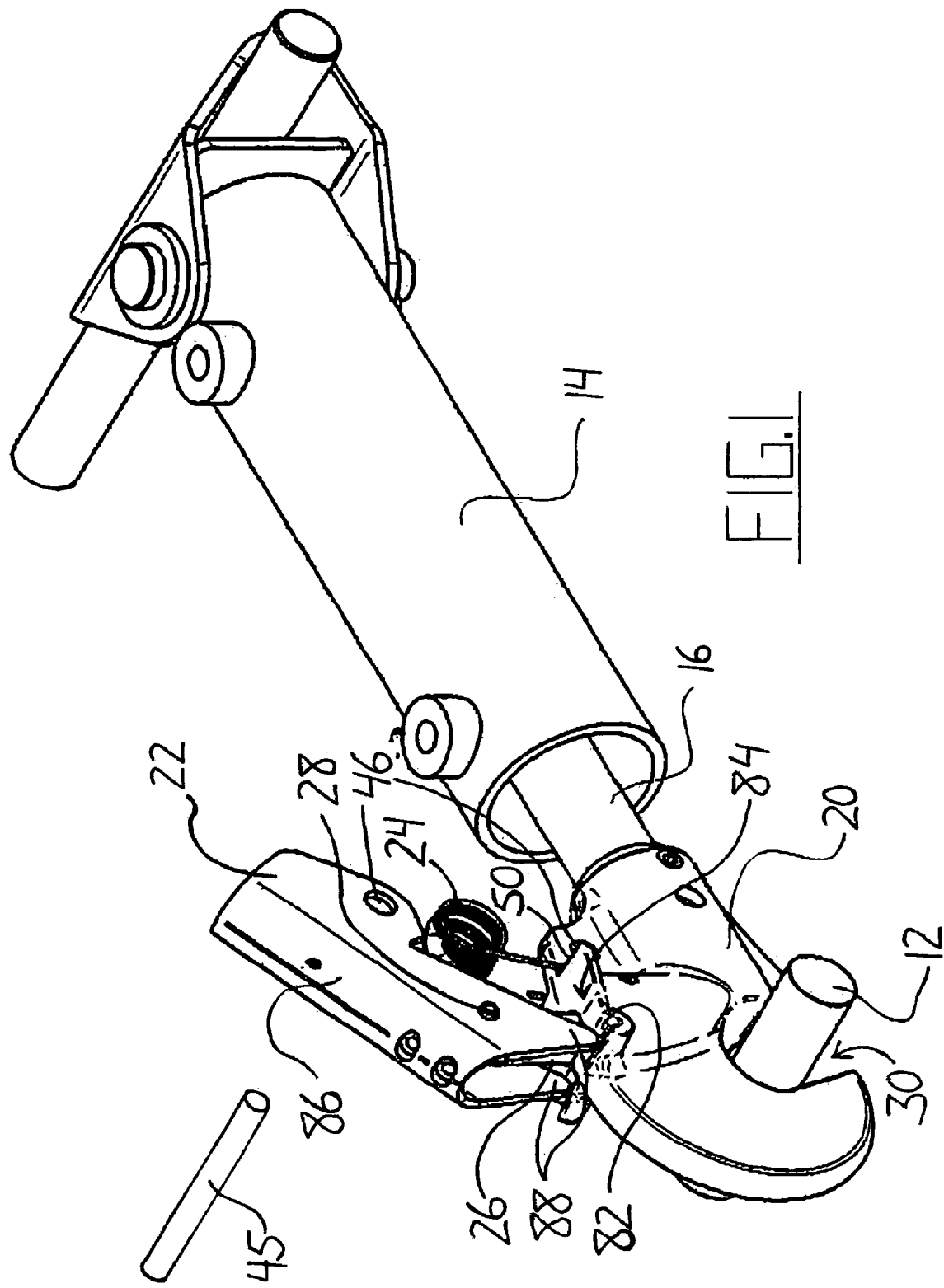
FIG. 1 is an isometric view of a coupling device having a coupling pin received in the mouth of a hook body and a control lever raised to an unlatching position in which the mouth is unobstructed by a locking bolt.

As shown in FIG. 1, the coupling device 10 of the present invention is arranged to connect a vehicle, such as a tractor or combine, on which it is mounted to an implement having a coupling pin 12. The device 10 features a hydraulic cylinder having a body 14 and a rod 16 which extends away from the vehicle. A hook body 20 is mounted at an end of the rod 16 opposite the cylinder body 14. At the top of the hook body 20 is a control lever 22 that is attached to the hook body 20 by a torsion spring 24. The control lever 22 is connected to a locking bolt 26 at a pivot point 28 and is used to control the position of the locking bolt 26 that extends vertically downward through the hook body into a mouth 30 of the hook body 20 where the coupling pin 12 is received. The position of the locking bolt 26 determines whether or not the coupling pin 12 is locked within the mouth 30.

Figure 2:
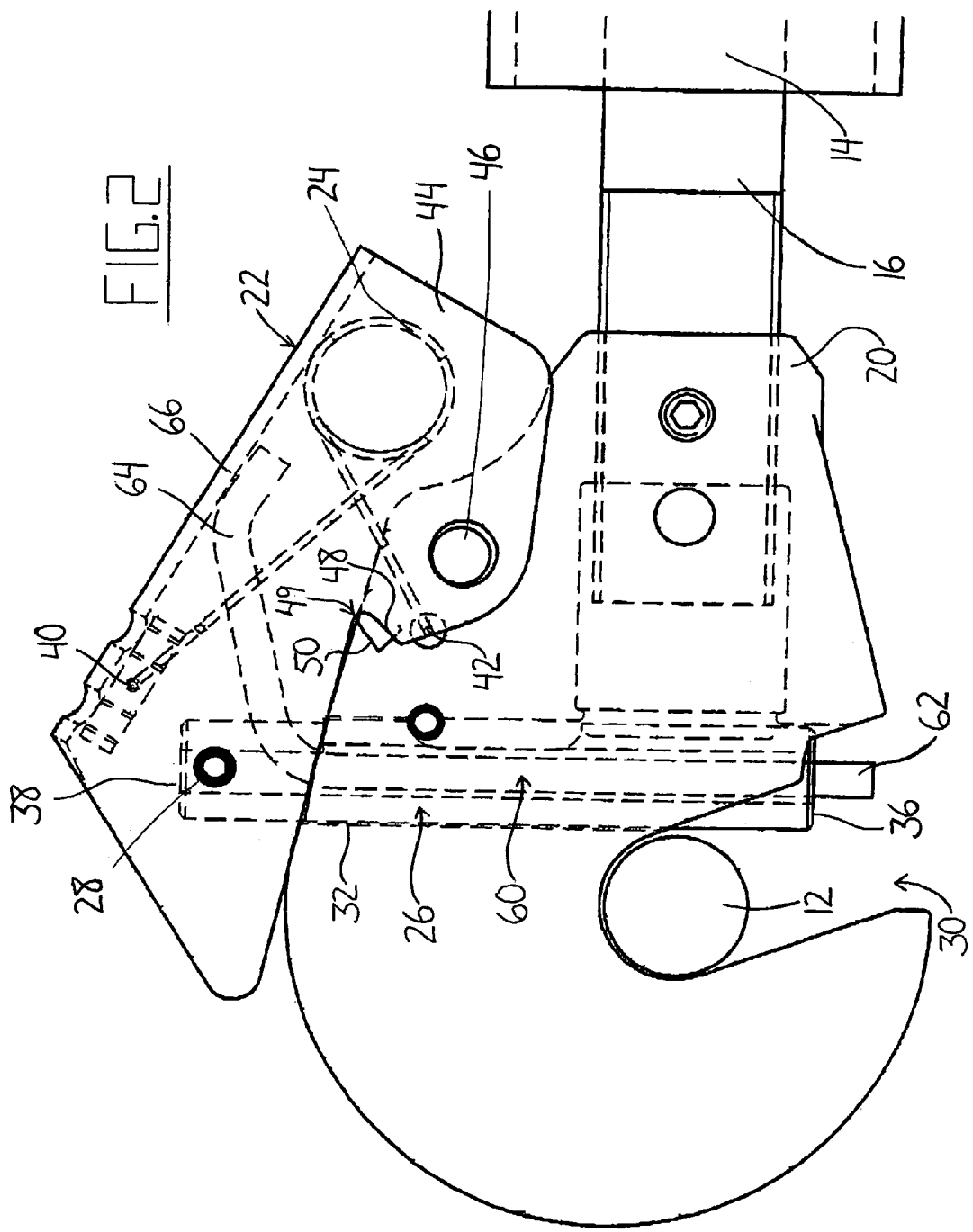
FIG. 2 is a partial side view of the coupling device of FIG. 1 having the control lever in a lowered latching position in which the locking bolt obstructs the mouth to secure the coupling pin therein.

FIG. 2 shows the device 10 with the coupling pin 12 received in the mouth 30, the locking bolt 26 in a lowered locking position and the control lever 22 in a corresponding lowered latching position. The cylindrical locking bolt 26 is received in a vertical cylindrical hole 32 extending down through the top of the hook body 20 to the mouth 30. The control lever 22 and the locking bolt 26 are connected by the pivot 28 near an upper end 38 of the locking bolt 26 above the hook body 20. A lower end 36 of the locking bolt 26 extends into the mouth 30 when the locking bolt 26 is in the lowered locking position. It should be appreciated that lifting of the lever 22 will cause the locking bolt 26 to rise. The spring 24 is pivotally attached to the control lever 22 and the hook body 20 at its opposite ends 40 and 42. The spring 24 is designed to pull the lever end 40 toward the hook end 42. With the control lever 22 in the lowered latching position of FIG. 2, the connection point at the lever end 40 is on the same side of the pivot 28 of the lever 22 as the hook end 42 thereby biasing the control lever 22 toward the lowered latching position.

With the coupling pin 12 received in the mouth 30, relative rotation of the hook body 20 and coupling pin 12 may cause friction tending to move the locking bolt 26 upward. This motion must be prevented in order to avoid unwanted decoupling of the device 10 and the implement having the coupling pin 12. An abutting surface 48 is defined by a recess 49 in the control lever 22. A corresponding bearing surface 50 extends outward from the hook body 20 just above the abutting surface 48 with the control lever in the lowered latching position of FIG. 2. It should be appreciated from the figure that upward movement of the locking bolt 26 from the locking position shown will cause a combination of linear and rotational motion of the control lever 22, causing the abutting surface 48 to move upward against the bearing surface 50. The engagement of these surfaces prevents further upward motion of the lever 22 and the connected locking bolt 26. Thus the coupling pin 12 is secured within the mouth 30 by the lower end 36 of the bolt 26.

The locking bolt 26 is hollow such that an operable pin 64 can be coaxially received therein for longitudinal motion relative to the bolt 26. As seen in the figures, the operable pin 64 is somewhat J-shaped. It extends vertically upward through the bolt 26 from a lower end 62 to an extension portion 64 that extends outward from an opening in the bolt 26 near the pivot 28 to an upper wall 66 of the lever 22 on the same side of the pivot 28 as the spring 24 and the blocking surfaces 48 and 50. In a lowered extending position, a bottom end 62 of the operable pin 60 extends significantly downward from the lower end 36 of the locking bolt. It is this operable pin 60 that allows coupling of the device 10 and the coupling pin 12 of the implement without having to manually rotate an end 44 of the lever 22 nearest the cylinder body 14 about the pivot 28 out of the lowered latching position and lift the locking bolt 26 out of the locking position in the mouth 30.

The device 10 is positioned on the coupling pin 12 such that the pin 12 is anywhere between the opening of the mouth 30 and the cylinder body 14. Pulling the hook body 20 away from the implement having the coupling pin 12, for example by compressing the hydraulic cylinder to move the rod 16 further into the housing 14, causes the stationary coupling pin 12 and the mouth 30 to get closer together.

Figure 4:
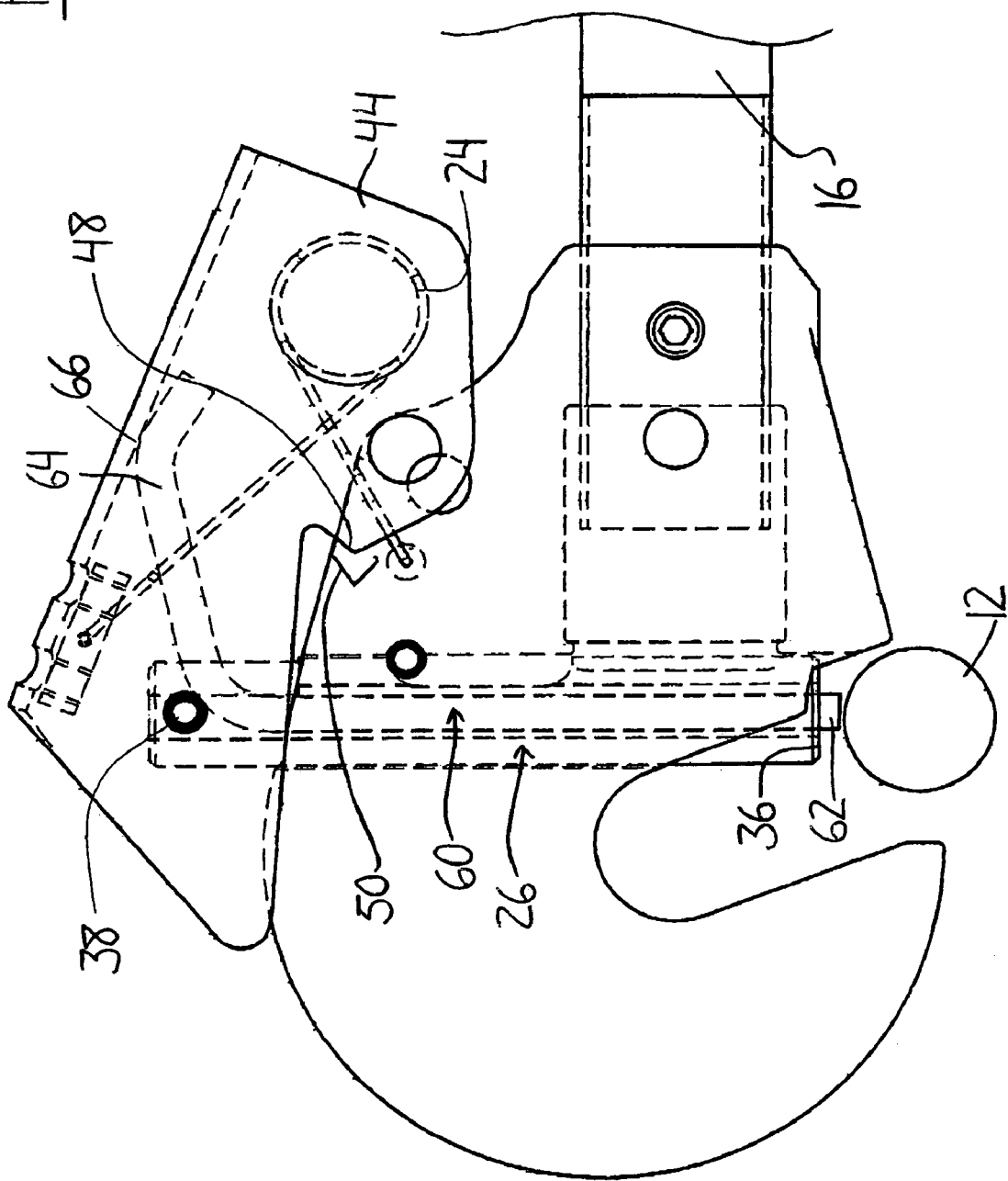
FIG. 4 is a partial side view of the coupling device of FIG. 3 after the coupling pin has entered the mouth and caused an operable pin to rise and move the control lever out of the lowered latching position.

The bottom surface 68 of the hook body 20 is sloped downward from the cylinder rod 16 to the opening of the mouth 30 to allow the device 10 to pass smoothly over the coupling pin 12 during the relative motion therebetween. When the coupling pin 12 reaches the mouth 30, the weight of the device 10 causes the hook body 20 to sink down such that the coupling pin 12 enters the mouth 30. Contact between the coupling pin 12 and the bottom end 62 of the operable pin 60 causes the operable pin to move up relative to the locking bolt 26 to a retracted position shown in FIG. 4. The operable pin has its lower engagement end contained within a line between the bottom end of the sloped surface 68 and the tip of the hook so that it is effectively contained within the mouth and is protected by the hook body from being inadvertently engaged.

In this position, the extension portion 64 of the operable pin 60 pushes up against the upper wall 66 of the control lever 22 causing the end 44 of the lever 22 to pivot upward about the pivot point 28 and disengage the abutment and bearing surfaces 48 and 50.

Figure 5:
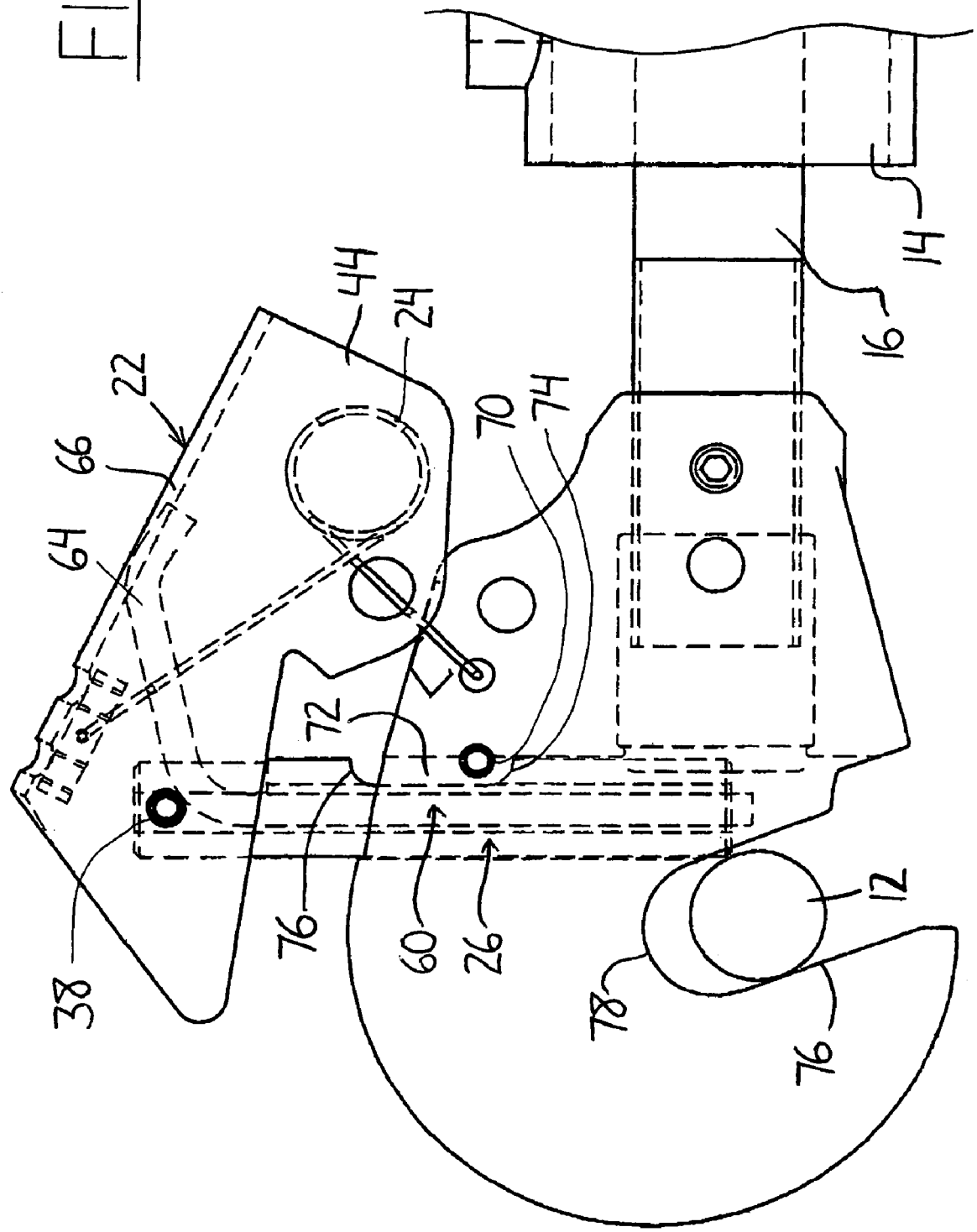
FIG. 5 is a partial side view of the coupling device of FIG. 4 after the coupling pin has moved further into the mouth and caused the locking bolt to rise and fully open the mouth.

With these control surfaces no longer blocking upward movement of the lever 22 and the locking bolt 26, contact with the coupling pin 12 causes the bolt 26 to move upward to the unlocking position shown in FIG. 5. In this position, the lower end 36 of the locking bolt 26 no longer blocks access to the concave end 78 of the mouth 30, so the coupling pin continues further into the mouth up the straight side wall 76 until it is nested at the concave end 78. With the coupling pin 12 received in the end 78 of the mouth, the rectilinear opening 32 is no longer obstructed by the pin 12, and so the spring 24 snaps the control lever 22 back to the latching position of FIG. 2. This action of the control lever 22 causes the attached locking bolt 26 and the contacting operable pin 60 to return to their locking and extending positions respectively, as also shown in FIG. 2. With the abutment and bearing surfaces 48 and 50 of the control lever 22 and hook body 20 once again engaged, the coupling pin 12 is secured within the mouth 30 of the device 10. In addition to the control surfaces 48 and 50, movement of the lever 22 and locking bolt 26 relative to the body 20 can be further prevented by passing a locking pin 45 through the aligned holes 46 in the hook body 20 and control lever 22.

To disengage the coupling pin 12 from the device 10, the control lever 22 is manually pivoted about the pivot point 28 to disengage the abutment surface 48 of the lever 22 and the bearing surface 50 of the hook body 20. The end 44 of the lever 22 is then lifted to move the lever 22 into the unlatching position shown in FIG. 6. Here, another end 80 of the lever 22 on a second side of the pivot point 28 opposite the first side is received in a groove 82 provided near the top of the hook body 20. The groove 82 is defined within a ledge 84 that protrudes outward from the hook body 20 along the top thereof. The control lever 22 is held in this position by the spring 24 and groove 82, as it can be seen in the figure that the lever end 40 of the spring 24 is located on the second side of the pivot point 28 in this position. As a result, the ends 40 and 42 of the spring 24 pulling toward one another does not cause the lever 22 to pivot back toward the latching position of FIG. 2 until the end 80 is manually removed from the groove 82. The end of the ledge 84 opposite the groove 82 defines the bearing surface 50 of the hook body 20.

Figure 6:
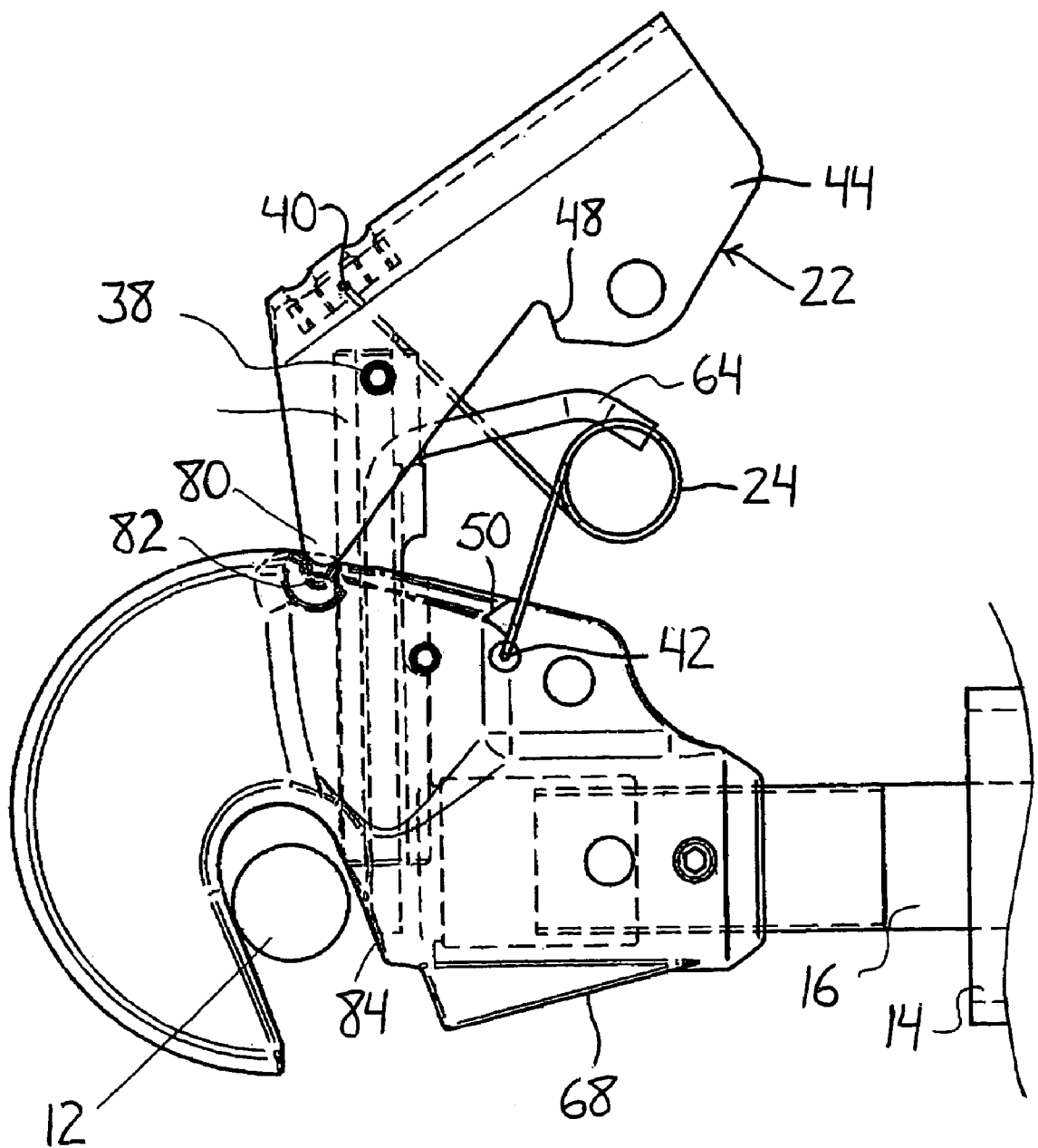
FIG. 6 is a partial side view of the coupling device of FIG. 1.

In the unlatching position of FIG. 6, the pivot point 28 at which the control lever 22 and the locking bolt 26 are connected is high enough to withdraw the lower end 36 of the locking bolt 26 and the bottom end 62 of the operable pin 60 from the mouth 30 through the rectilinear opening 32. With the mouth 30 unobstructed, pushing the hook body 20 against the coupling pin 12 will cause the device 10 to rise up off the pin due to engagement of the pin 12 and sloped side 84 of the mouth 30, eventually returning the pin 12 to the bottom surface 68 of the hook body.

Figure 3:
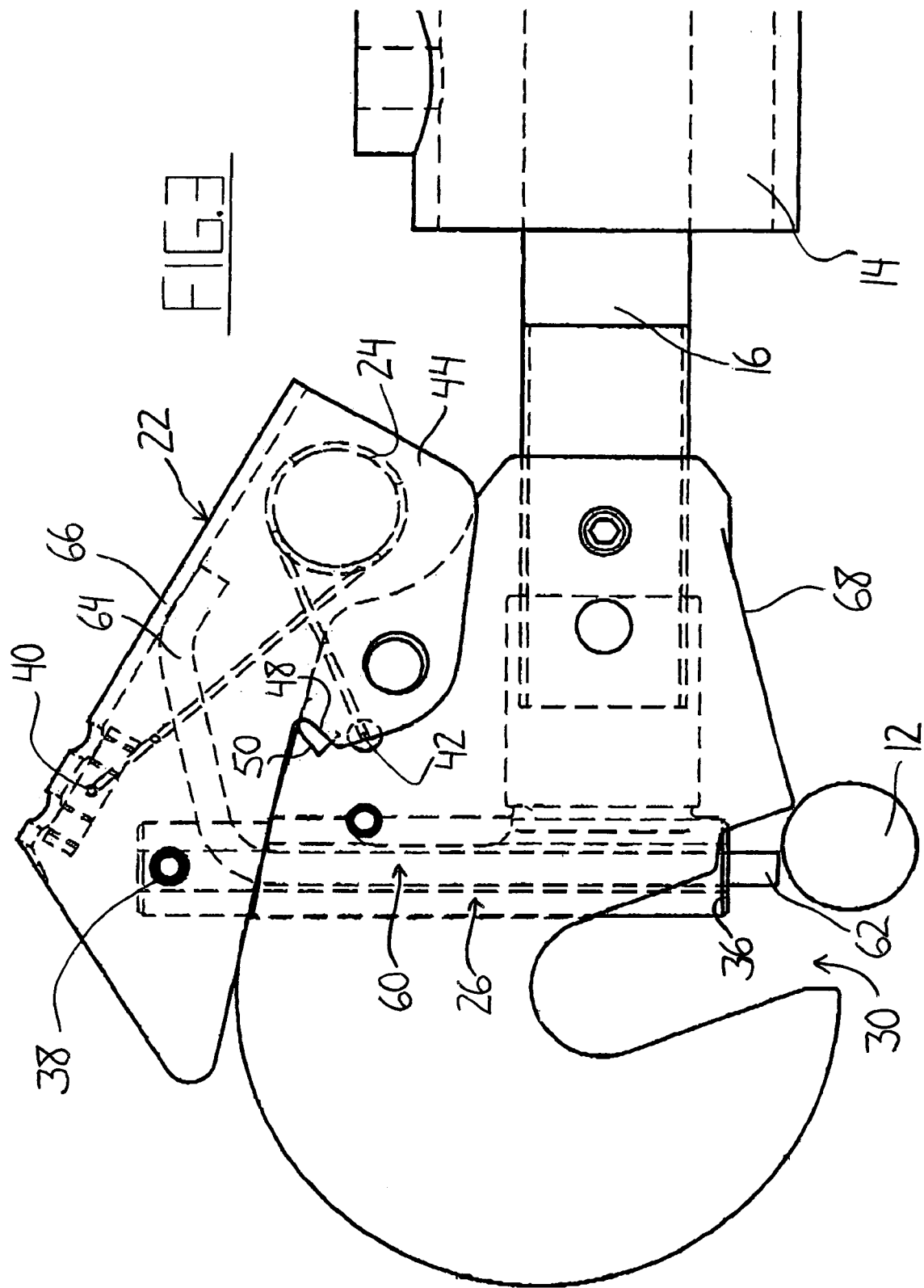
FIG. 3 is a partial side view of the coupling device of FIG. 2 before the coupling pin is received in the mouth of the hook body.

As seen in FIG. 5, the hook body 20 features a stationary obstruction pin 70 that extends partially into the rectilinear opening 32 and serves to limit motion of the locking bolt 26 with respect the hook body 20. A longitudinal groove 72 is provided in a side of the locking bolt 26 for engagement with the obstruction pin 70. A lower end 74 of the groove 72 engages the pin 70 to prevent upward motion of the locking bolt 26 passed the unlocking position in which the mouth 30 is not blocked by its lower end 36. This corresponds to the unlatching position of the control lever 22 shown in FIG. 6. Similarly, an upper end 76 of the longitudinal groove 72 engages the pin 70 to prevent downward motion of the locking bolt 26 passed the locking position in which the mouth 30 is blocked by its lower end, corresponding to the latching position of the control lever 22 as shown in FIGS. 2 and 3. The groove 72 and obstruction pin prevent the locking bolt from being pulled up entirely out of the rectilinear opening 32 by the lever 22.

It should be appreciated from FIG. 1 that the control lever 22 is a U-shaped channel member defined by side walls 88 connected by a curved upper wall 86. As a result, the spring 24 is disposed between the side walls 88 along with the extension portion 64 of the operable pin 60 and the upper end 38 of the locking bolt 26. The hook body 20 and the control lever 22 are each generally symmetric about a vertical plane extending along a central longitudinal axis of the device 10 such that the above description referring to the side views of FIGS. 2-6 applies to each side of the coupling device.

The hydraulic cylinder is used to provide the coupling device 10 with an adjustable length. The cylinder rod 16 can be extended from and retracted into the cylinder body 14 as needed to adjust the length of the device. This feature can be used to pull the hook body 20 over the coupling pin 12 for attachment and to push the hook body against the pin 12 to remove it from the mouth 30. When used as an upper link for a three-point hitch, the device can therefore be adjusted by hydraulic controls provided on the tractor. The present invention can be used to quickly and easily couple an implement and a tractor together, as the control lever need not be manually actuated to facilitate a locking connection. Furthermore, accurate positioning of the mouth 30 is not required to connect the device 10 and the coupling pin 12, as coupling can be achieved by merely pulling the hook body 20 over the pin.

While described for use in the secure connection of agricultural implements and vehicles, it should be appreciated that the coupling device of the present invention is not limited to that particular use. Furthermore, while the detailed embodiment features a locking bolt 26, operable pin 26 and control lever 22, arrangements featuring alternate securing members and release members may be used to achieve a similar result. The concept behind the present invention is to provide coupling device wherein the securing member that prevents detachment of the connected implements is locked in place by default unless a releasing member is actuated by contact with the coupling element to open the mouth of the hook. This results in the elimination of both the need for manual actuation of locking components and overly accurate positioning of the device to achieve secure coupling. In the detailed embodiment, the mouth 30 extended upward from the bottom outer surface 68 of the hook body 20 and the locking bolt 26 and operable pin 60 extended vertically. This arrangement allows coupling to be achieved by the weight of the device 10 being exerted on the coupling pin 12 through the operable pin 60. It should be appreciated that the device 10 may be used in other orientations wherein the force between the coupling and operable pins 12 and 60 required for opening the mouth 30 is not provided by gravity.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A coupling device comprising:
    a hook body shaped to define an outer surface with a mouth extending inward from the outer surface of said hook body, said mouth having an end portion spaced from said outer surface, such that a member to be hooked can enter the mouth from the outer surface and move to the end portion to effect coupling between the hook body and the member;
    the hook body having a rear surface opposite to the outer surface and an end connected to a coupling member for applying force in a direction longitudinally of the hook member from the coupling member to the member to be hooked;
    an elongate securing member supported on the hook body and extending through a channel on the hook body having a length from the rear surface through the hook body toward the mouth, said securing member being slidably movable along the length of the channel in a direction transverse to said longitudinal direction between an extended position in which said securing member substantially obstructs passage of the member to be hooked to and from the end portion and a retracted position in which said securing member does not substantially obstruct said passage;
    the securing member being biased toward the extended position;
    a releasable locking arrangement mounted on the hook body at the rear surface locking the securing member in the extended position to prevent unwanted movement toward the retracted position;
    an elongate releasing member supported on the hook body and presenting an end portion at the outer surface operable by engagement with an element of the member to be hooked at the outer surface of the hook body and movable along the length of the elongate releasing member in a direction parallel to the securing member and transverse to said longitudinal direction for moving the releasable locking arrangement at the rear surface to unlock the securing member and allow movement thereof toward the retracted position, actuation of said releasing member thereby opening the passage for the element of the member to be hooked to the end portion of the mouth;
    wherein the end portion of the releasing member is located at the outer surface at one side of the mouth such that the member to be hooked when sliding over the outer surface encounters and engages the end portion of the releasing member.

2. The coupling device according to claim 1 wherein the end portion of the releasing member is located within a portion of the mouth such that the end portion is protected by the outer surface from engagement by elements exterior to the mouth.

3. The coupling device according to claim 1 wherein the end portion of the releasing member is mounted such that it moves in a direction into the mouth and thus is depressed by the member to be hooked when sliding into the mouth from the outer surface.

4. The coupling device according to claim 1 wherein the releasing member is mounted on the securing member for common movement therewith.

5. The coupling device according to claim 1 wherein the releasable locking arrangement includes a control lever pivotally coupled to the securing member at a pivot point adjacent an end of said securing member at the rear surface of the hook body opposite the mouth, said control lever being movable between a latching position in which the securing member is in the extended position and an unlatching position in which said securing member is in the retracted position.

6. The coupling device according to claim 5 wherein said releasable locking arrangement comprises an abutment surface at the control lever and a bearing surface at the hook body, the surfaces being spaced from the pivot point to a first side thereof and being arranged to engage thereby locking said securing member in the extended position.

7. The coupling device according to claim 5 further comprising a torsion spring pivotally connected at opposite ends thereof to the control lever and the hook body to bias said control lever toward the latching position such that said securing member tends to return to said extended position after actuation of the releasing member.

8. The coupling device according to claim 5 wherein the hook body further comprises a groove for receiving an end of the control lever as said control lever reaches the unlatching position, said end being on a second side of the pivot point opposite the first side thereof.

9. The coupling device according to claim 7 wherein the torsion spring is connected to the hook body on a first side of the pivot point, said torsion spring is connected to the control lever on said first side with said lever out of the unlatching position and said pivot spring is connected to said control lever on a second side opposite said first side with said control lever in the unlatching position such that said control lever is held in the unlatching position with the end of said control lever received in the groove and said control lever is biased toward the latching position when said end is removed from said groove, the securing member thereby tending to return to said extended position after actuation of the releasing member unless said control lever is in the unlatching position.

10. The coupling device according to claim 5 wherein the control lever comprises a U-shaped channel member having side walls, the securing member being disposed between said side walls.

11. The coupling device according to claim 5 wherein the control lever comprises a recess defining the abutment surface thereof and the hook body comprises a protrusion defining the bearing surface thereof.

12. The coupling device according to claim 8 wherein the hook body comprises a shaped ledge extending from the first side of the pivot point to the second side thereof, said ledge defining the bearing surface and the groove at opposite ends thereof.

13. The coupling device according to claim 1 wherein the hook body and the coupling member are arranged so that the outer surface faces downwardly to form a bottom surface over which the member to be hooked can slide.

14. The coupling device according to claim 13 wherein the bottom surface slopes downwardly from the coupling member toward the mouth of the hook body.

15. The coupling device according to claim 14 wherein the coupling member comprises a hydraulic cylinder which is adjustable in length.

16. The coupling device according to claim 5 wherein there is provided a locking pin and wherein the control lever and the hook body each have a transverse hole therethrough, said holes being aligned with said control lever in the latching position such that said locking pin can be passed therethrough to secure the securing member and said control lever in the extended and latching positions respectively regardless of actuation of the release member.

17. A coupling device comprising:
a hook body shaped to define an outer surface with a mouth extending inward from the outer surface of said hook body, said mouth having an end portion spaced from said outer surface, such that a member to be hooked can enter the mouth from the outer surface and move to the end nortion to effect coupling between the hook body and the member;
a securing member supported on the hook body and extending toward the mouth, said securing member being movable between an extended position in which said securing member substantially obstructs passage of the hooked member to and from the end portion and a retracted position in which said securing member does not substantially obstruct said passage;
the securing member being biased toward the extended position;
a releasable locking arrangement for locking the securing member in the extended position to prevent unwanted movement toward the retracted position;
a releasing member supported on the hook body and presenting an end portion at the outer surface operable by engagement with an element of the member to be hooked at the outer surface of the hook body to unlock the securing member and allow movement thereof toward the retracted position. actuation of said releasing member thereby opening the passage for the element of the member to be hooked to the end portion of the mouth;
wherein the releasable locking arrangement includes a control lever pivotally coupled to the securing member at a pivot point adjacent an end of said securing member at the rear surface of the hook body opposite the mouth, said control lever being movable between a latching position in which the securing member is in the extended position and an unlatching position in which said securing member is in the retracted position;
wherein said releasable locking arrangement comprises an abutment surface at the control lever and a bearing surface at the hook body, the surfaces being surface from the pivot point to a first side thereof and being arranged to engage thereby locking said securing member in the extended position;
wherein the release member comprises a pin having a first end adjacent the outer surface of the hook body from which the mouth extends and a second end for engagement with the control lever on the first side of the pivot point, said pin being operable with the securing member in the extended position by pushing on said first end such that said second end pivots the control lever out of the latching position, thereby disengaging the abutting and bearing surfaces to unlock said securing member from the extended position.

18. A coupling device comprising:
a hook body shaped to define an outer surface with a mouth extending inward from the outer surface of said hook body, said mouth having an end portion spaced from said outer surface, such that a member to be hooked can enter the mouth from the outer surface and move to the end portion to effect coupling between the hook body and the member;
a securing member supported on the hook body and extending toward the mouth, said securing member beino movable between an extended position in which said securing member substantially obstructs passage of the hooked member to and from the end portion and a retracted position in which said securing member does not substantially obstruct said passage;
the securing member being biased toward the extended position;
a releasable locking arrangement for locking the securing member in the extended position to prevent unwanted movement toward the retracted position;
a releasing member supported on the hook body and presenting an end portion at the outer surface operable by engagement with an element of the member to be hooked at the outer surface of the hook body to unlock the securing member and allow movement thereof toward the retracted position, actuation of said releasing member thereby opening the passage for the element of the member to be hooked to the end portion of the mouth;
wherein the securing member defines a longitudinal channel and the release member comprises a pin which is received in said channel for movement therealong.

* * * * *